(12) United States Patent
Zhang et al.

(10) Patent No.: US 9,823,702 B2
(45) Date of Patent: Nov. 21, 2017

(54) ELECTRONIC DEVICE HAVING A DETACHABLE TABLET

(71) Applicant: INTEL CORPORATION, Santa Clara, CA (US)

(72) Inventors: Ming Zhang, Shanghai (CN); Michael T. Crocker, Portland, OR (US); Xiaofeng Shawn Sheng, Shanghai (CN); Alan W. Tate, Puyallup, WA (US); Shanjun Deng, Shanghai (CN); Kapil Kane, Shanghai (CN); Minglei Wang, Shanghai (CN); Russell Beauregard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 14/129,252

(22) PCT Filed: Mar. 29, 2013

(86) PCT No.: PCT/CN2013/073448
§ 371 (c)(1),
(2) Date: Dec. 24, 2013

(87) PCT Pub. No.: WO2014/153773
PCT Pub. Date: Oct. 2, 2014

(65) Prior Publication Data
US 2015/0205330 A1 Jul. 23, 2015

(51) Int. Cl.
*G06F 1/16* (2006.01)
*H01R 31/00* (2006.01)

(52) U.S. Cl.
CPC .......... *G06F 1/1656* (2013.01); *G06F 1/1626* (2013.01); *G06F 1/1632* (2013.01);
(Continued)

(58) Field of Classification Search
None
See application file for complete search history.

(56) References Cited

U.S. PATENT DOCUMENTS

| 6,590,547 B2 * | 7/2003 | Moriconi | G06F 1/1616 248/917 |
| 6,775,129 B1 | 8/2004 | Ghosh et al. | |

(Continued)

FOREIGN PATENT DOCUMENTS

| CN | 1567122 A | 1/2005 |
| CN | 1635444 A | 7/2005 |

(Continued)

OTHER PUBLICATIONS

Taiwanese Search Report for Application 103110495 dated Nov. 25, 2015 and English translation.

(Continued)

*Primary Examiner* — Courtney Smith
*Assistant Examiner* — Rashen E Morrison
(74) *Attorney, Agent, or Firm* — Schwabe, Williamson & Wyatt, P.C.

(57) ABSTRACT

An electronic device may be provided that includes a base portion having an input device, a tablet having a display and a docking connector with a plurality of second electrical connectors, and a docking connector to move relative to the base portion. The docking connector may include a first docking pole to extend from the docking connector and to engage with the docking receptacle, and a plurality of first electrical connectors.

18 Claims, 19 Drawing Sheets

(52) U.S. Cl.
CPC .......... *G06F 1/1643* (2013.01); *G06F 1/1654* (2013.01); *H01R 31/00* (2013.01)

(56) References Cited

U.S. PATENT DOCUMENTS

| | | | |
|---|---|---|---|
| 6,788,527 | B2 | 9/2004 | Doczy et al. |
| 7,052,256 | B2* | 5/2006 | Neuhaus ................ F04C 2/086 418/186 |
| 7,206,196 | B2 | 4/2007 | Ghosh et al. |
| 7,251,127 | B2 | 7/2007 | Ghosh et al. |
| 7,633,750 | B2* | 12/2009 | Fan ...................... G06F 1/1632 361/679.41 |
| 8,422,210 | B2* | 4/2013 | Moser .................. G06F 1/1616 248/639 |
| 8,498,100 | B1* | 7/2013 | Whitt, III ............. G06F 1/1618 361/679.17 |
| 2004/0246666 | A1 | 12/2004 | Maskatia et al. |
| 2008/0232061 | A1 | 9/2008 | Wang et al. |
| 2009/0141439 | A1 | 6/2009 | Moser |
| 2009/0244009 | A1 | 10/2009 | Staats et al. |
| 2011/0292584 | A1 | 12/2011 | Hung et al. |
| 2012/0236485 | A1 | 9/2012 | Staats et al. |
| 2013/0044454 | A1 | 2/2013 | Lin et al. |

FOREIGN PATENT DOCUMENTS

| | | |
|---|---|---|
| CN | 1300656 C | 2/2007 |
| CN | 202455033 | 9/2012 |
| JP | 2011-248872 | 12/2011 |
| KR | 2005-0105065 | 11/2005 |
| KR | 10-0538649 | 12/2005 |
| KR | 10-2012-0115899 | 10/2012 |
| TW | 2008-07221 A | 2/2008 |
| TW | M397130 | 1/2011 |
| TW | 2011-46148 A | 12/2011 |
| WO | 2014/153773 A1 | 10/2014 |

OTHER PUBLICATIONS

International Search Report and Written Opinion for Application PCT/CN2013/073448 dated Jan. 9, 2014 and English Translation.
Korean Office Action for Application 2015-7023468 dated Jun. 29, 2016 (full Korean text and full English translation).
Partial European Search Report issued in Application EP 13 88 0288 dated Jan. 10, 2017.
Korean Office Action issued in Application 2015-7023468 dated Jan. 31, 2017 and English translation.

* cited by examiner

ELECTRONIC DEVICE HAVING A DETACHABLE TABLET

BACKGROUND

1. Field

Embodiments may relate to an electronic device, such as a computer system, that has a detachable tablet.

2. Background

A computer system may include several components such as a display, a keyboard and/or a processor. The computer system may be provided in many different configurations.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in detailed description to follow, example sizes/models/values/ranges may be given although embodiments are not limited to the same. Where specific details are set forth in order to describe example embodiments, it should be apparent to one skilled in the art that embodiments may be practiced without these specific details.

Embodiments may relate to an electronic device, such as a computer system, that includes a detachable tablet, a base and a docking connector. The base may also be considered a base portion, a docking unit or a docking station. The detachable tablet may also be considered a display portion, a tablet or a lid.

The tablet may be considered to be connected (or coupled) to the base when the tablet is physically connected (or coupled) to the docking connector, which in turn is physically connected to the base.

Figure 1:
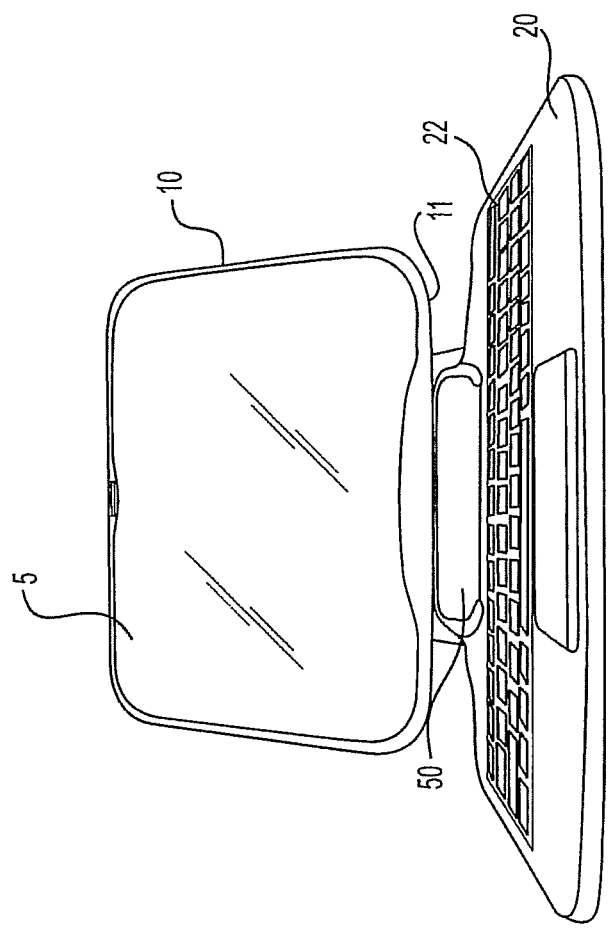
FIG. 1 shows an electronic device according to an example embodiment.

FIG. 1 shows an electronic device, such as a computer system, according to an example embodiment. Other embodiments and configurations may also be provided.

More specifically, FIG. 1 shows a tablet 10 (or display portion), a base 20 (or base portion) and a docking connector 50. For ease of illustration and description, FIG. 1 shows the tablet 10 as being physically separated from the docking connector 50 (and from the base 20). The electronic device may be a tablet type computer system in which the tablet 10 (or display portion) may be detachable from the docking connector 50 and/or other components of the electric device, such as the base 20.

The tablet 10 (or display portion) may include a display 5, a processor, a chipset, a WiFi component, a memory and/or a battery (or battery pack). Other components may also be provided on, at or in the tablet 10. FIG. 1 also shows an outer side edge 11 (or bottom edge) that may at least partially couple to the docking connector 50. The tablet may include a docking receptacle as will be described below.

The base 20 (or base portion) may include components such as a keyboard 22, a touch pad, a processor, input ports, etc. In at least one embodiment, the base 20 may be a keyboard, and most of the electronic components may be provided in the tablet 10. The base 10 may have an input device, for example.

The display 5 may be provided on a front surface of the tablet 10, as shown in FIG. 1. The display 5 may include a touch-sensitive display and display logic, at least a portion of which is hardware. The battery may supply power to the tablet 10 when the tablet 10 is not electrically connected to a power source.

The docking connector 50 may permit (or allow) the tablet 10 to attach (or dock) to the base 20. The docking connector 50 may also permit (or allow) the tablet 10 to dock and operate as a convertible computer or a clamshell computer, for example.

Components of the docking connector 50 may be provided within the base 20 and/or provided within the tablet 10.

The display portion may include logic, instructions and/or code to perform operations discussed below, such as automatically disengaging a docking receptacle (at the display portion) from portions of a docking connector.

Figure 2B:
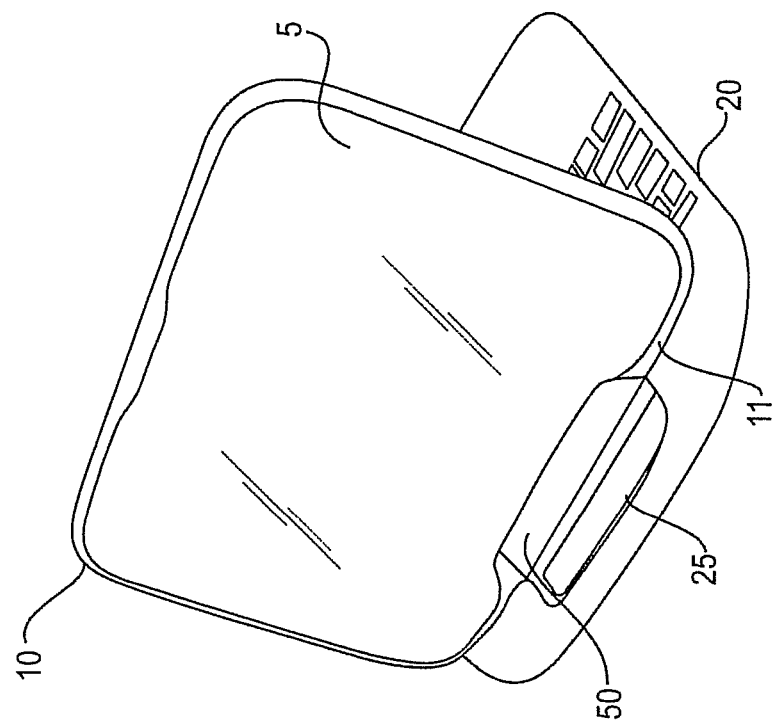
FIG. 2B shows an electronic device in a reverse clamshell configuration.
Figure 2A:
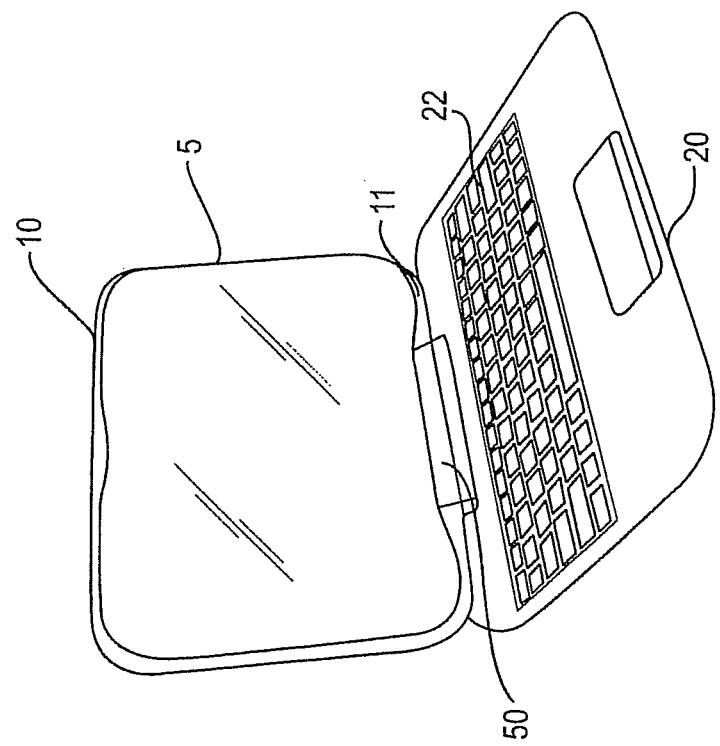
FIG. 2A shows an electronic device in a forward clamshell configuration.

FIG. 2A shows the electronic device (from FIG. 1) in a clamshell configuration in which the tablet 10 is docked to the docking connector 50 (and to the base 20) in a first configuration (or forward configuration). In the first configuration of the clamshell configuration, a user may view both the display 5 (on the tablet 10) and the keyboard 22 on the base 20. The electronic device shown in FIG. 2A may also be considered to be in a normal docking usage configuration (or mode) in which the display 5 faces the user and the keyboard 22 is provided in front of the user.

FIG. 2B shows the electronic device (from FIG. 1) in a clamshell configuration in which the tablet 10 is docked to the docking connector 50 (or the base 20) in a second configuration (or reverse configuration). In the second configuration shown in FIG. 2B, the display 5 of the tablet 10 may be facing a user and the keyboard 22 (of the base 20) may be behind a rear surface of the tablet 10. The tablet 10 may be considered to be reversely attached to the docking connector 50 (and to the base 20). The electronic device shown in FIG. 2B may also be considered to be in a reversed docking usage configuration (or mode) in which the display 5 faces the user and the keyboard 22 is behind the display 5.

The base 20 may include a top surface and a bottom surface. The keyboard 22 may be provided at, on or in the top surface of the base 20. A touch pad may also be provided on the top surface of the base 20. The base 20 may include an input device.

FIG. 2B also shows that the base 20 may include a handle opening 25, which is an opening between the top surface and the bottom surface of the base 20. The handle opening 25 may be near a rear edge of the base 20. The handle opening 25 may allow a user to easily carry the base 20 (and the tablet 10 when the tablet 10 is physically connected to the base 20). The handle opening 25 may also allow the docking connector 50 to rotate or pivot between different positions (relative to the base 20 and the tablet 10).

Figure 2D:
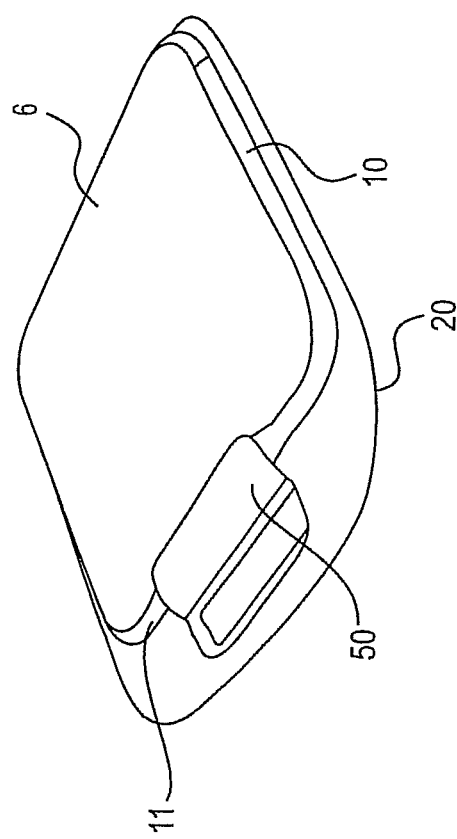
FIG. 2D shows an electronic device in a convertible configuration with a display facing down.
Figure 2C:
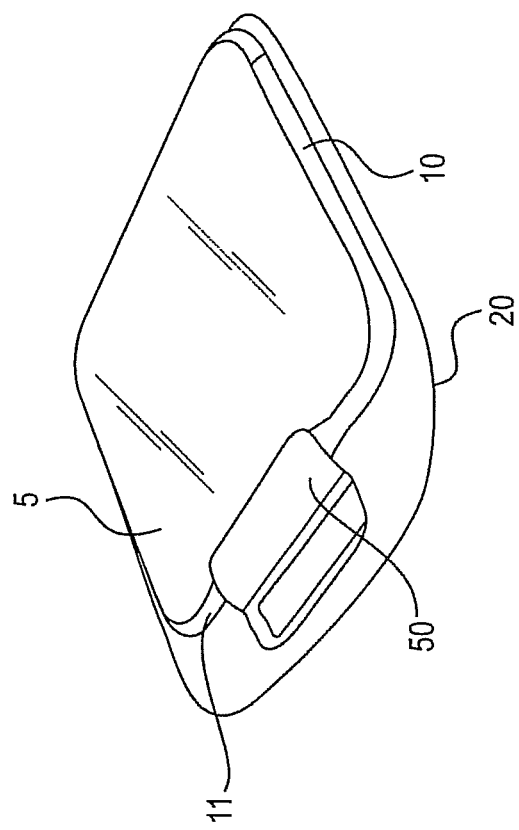
FIG. 2C shows an electronic device in a convertible configuration with a display facing up.

FIG. 2C shows the electronic device in a convertible configuration (or a convertible usage mode) in which the tablet 10 is reversely docked to the docking connector 50 (and the base 20). In the convertible configuration, the display 5 (of the tablet 10) may be facing away from the keyboard 22 (of the base 10). In FIG. 2C, the display 5 is facing upwards. As shown in FIG. 2C, the tablet 10 may pivot sufficiently to cover the keyboard 22 (of the base 20), and the display 5 (of the tablet 10) may face outward from the electronic device.

FIG. 2D shows the electronic device in a convertible configuration with the display 5 facing downward toward the keyboard. FIG. 2D shows a rear side 6 of the tablet 10.

Figure 3:
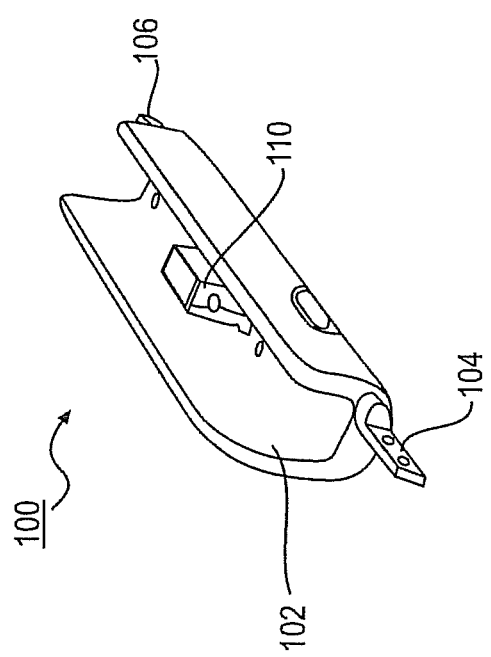
FIG. 3 shows a docking connector according to an example embodiment.

FIG. 3 shows a docking connector according to an example embodiment. Other embodiments and configurations may also be provided.

More specifically, FIG. 3 shows portions of a docking connector 100 according to an example embodiment. The docking connector 100 may correspond to the docking connector 50 discussed above. The docking connector 100 may be coupled to the base 20, and/or may be detachably coupled to the tablet 10. Another portion of the docking connector (such as a docking receptacle) may be provided at, on or in the tablet 10.

The docking connector 100 may be provided between the tablet 10 and the base 20 to allow the tablet 10 to attach (or mount) to the base 20. The docking connector 100 may include a docking cover 102 (or cover member). As shown in FIG. 3, the docking cover 102 may be U-shaped so as to receive the tablet 10 within the U shape. The docking cover 102 may be formed of plastic, for example.

The outer side edge 11 of the tablet 10 may be received within the docking cover 102 so as to dock (or mount) the tablet 10 to the docking connector 100 (and to the base 20).

The docking connector 100 may include a first end connector 104 provided at a first end of the U-shaped cover 102, and a second end connector 106 provided at a second end of the U-shaped cover 102. The end connectors 104, 106 may each be separately attached to the base 20 and at an area near the handle opening 25. The first and second end connectors 104, 106 may be rotatably coupled to the U-shaped cover 102. Alternatively, the first and second end connectors 104, 106 may be rotatably coupled to the base 20.

The first and second end connectors 104, 106 may allow the docking connector 100 to pivot (or rotate) relative to the base 20. This may occur when the docking cover 102 is tilted relative to the base 20. For example, the docking cover 102 (of the docking connector 100) may pivot (or rotate) when the outer side edge 11 of the tablet 10 is received within the docking cover 102 and the tablet 10 is physically moved (or rotated) in a forward direction or a rear direction.

The docking connector 100 may be provided in a substantially center of a width of the base 20. More specifically, the docking connector 100 may be provided at an area of the handle opening 125 and at a central width area of the base 20.

The docking connector 100 may include a docking pole 110 provided at a central area of the docking cover 102. The docking pole 110 may also be called a docking mechanism or a docking plug. The docking pole 110 may provide support. The docking pole 110 may extend upwards from the U-shaped cover 102. The docking pole 110 may have a box-like shape.

A portion of the tablet 10 (and/or another component of the docking connector 100) may be provided around the docking pole 110 when the tablet 10 is docked (or mounted) to the docking pole 110 (and/or to the base 20).

The docking connector 100 may move relative to the base 20.

Figure 4:
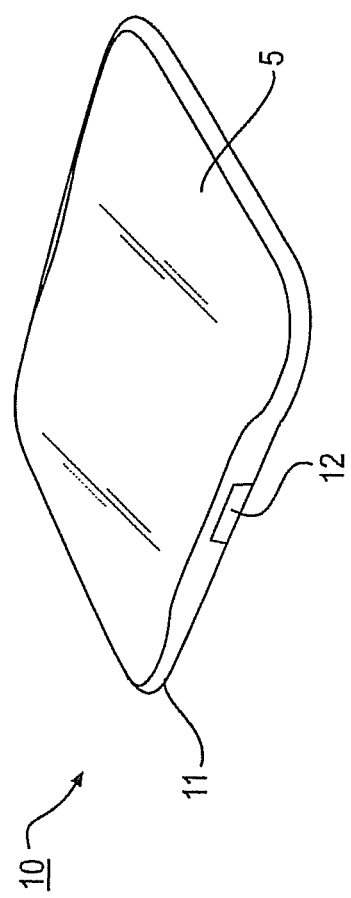
FIG. 4 shows a tablet having a single slot according to an example embodiment.

FIG. 4 shows a tablet having a single slot according to an example embodiment. Other embodiments and configurations may also be provided.

More specifically, FIG. 4 shows that the tablet 10 includes a slot 12 (or opening) along the outer side edge 11 of the tablet 10. The outer side edge 11 may also be considered a bottom edge of the tablet 10. Electrical connectors and/or components may be provided within the slot 12 (of the tablet 10) in order to make an electrical and physical connection with components within (or associated with) the docking connector 100 and/or the base 20.

The slot 12 may be a single slot provided in a center area of the outer side edge 11 of the tablet 10. In at least one embodiment, the slot 12 may receive the docking pole 110 (or other mechanism) within the slot 12, and the tablet 10 may be guided onto the docking connector 100. When the tablet 10 is docked (or mounted) to the docking connector 100, at least a portion of the docking pole 110 may be provided within the slot 12 (of the tablet 10). The docking pole 110 may provide an electrical and/or physical connection between the tablet 10 and the base 20.

In at least one embodiment, the tablet 10 may be provided (or used) in a tablet usage mode in which only the tablet 10 is directly handled by the user. The user may eventually dock (or mount) the tablet 10 to the docking connector 100 by providing (or guiding) the docking pole 110 into the slot 12.

The tablet 10 may be provided in a clamshell configuration (or normal usage mode), such as shown in FIG. 2A, when the tablet 10 is docked (or mounted) at the docking connector 100 (or the docking connector 50). In the clamshell configuration (or the normal usage mode), the tablet 10 (and the docking connector 100) may rotate relative to the base 20. In other words, while maintaining an electrical connection via the docking connector 100 (or the docking connector 50), the tablet 10 may rotate (or pivot) relative to the base 20.

The electronic device (or computer system) may support communication between the tablet 10 and the base 20 when the electronic device is in a normal usage mode (as in FIG. 2A) and/or when the electronic device is in a reverse usage mode (as in FIG. 2B).

The docking connector 100 may support various features and operations relating to the keyboard, a touchpad, backup battery support, USB connection, etc. The docking connector 100 may also support a normal usage mode and a reverse usage mode.

An embodiment may integrate connectors between a docking pole and a docking receptacle. An electrical connection and a physical connection may be provided between the docking pole and the docking receptacle.

In at least one embodiment, the docking receptacle may have a box-like shape to be provided around the docking pole, which may also have a box-like shape.

The docking receptacle may include a first plurality of electrical connectors on a first inner surface (or side) of the docking receptacle and a second plurality of electrical connectors on a second inner surface (or side) of the docking receptacle. The electrical connectors may be pins (or other types of connectors) that are arranged and provided in a specific order based on a desired function/operation associated with the respective pin.

The pin configuration of the first plurality of electrical connectors may be arranged to support communication between the tablet 10 and the base 20 when the tablet 10 is docked (or mounted) in a normal manner to the docking pole (and with respect to the tablet 10). The pin configuration of the second plurality of electrical connectors may be arranged to support communication between the tablet 10 and the base 20 when the tablet 10 is docked (or mounted) in a reverse manner to the docking pole (and with respect to the tablet).

Figure 5:
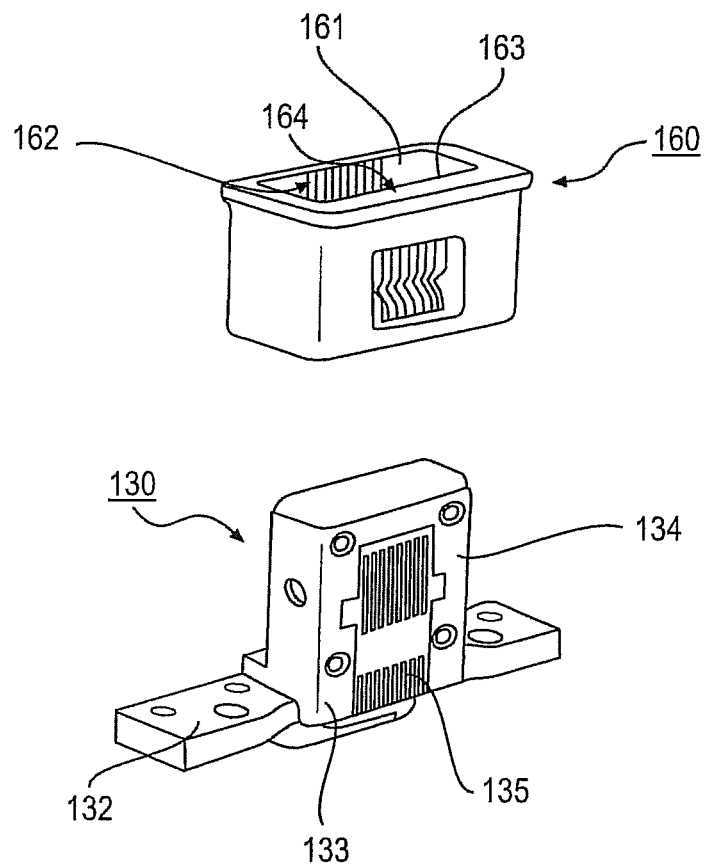
FIG. 5 shows a docking pole and a docking receptacle according to an example embodiment.

FIG. 5 shows a docking pole and a docking receptacle according to an example embodiment. Other embodiments and configurations may also be provided.

More specifically, FIG. 5 shows a docking pole 130 and a docking receptacle 160. The docking pole 130 may correspond to the docking pole 110 discussed above.

FIG. 5 shows the docking receptacle 160 being physically separated from the docking pole 130. The docking pole 130 and the docking receptacle 160 may be considered as components of a docking connector.

The docking pole 130 may include a support member 132 and an extending member 134.

The support member 132 may be provided at or within a docking cover (such as the docking cover 102) of a docking connector, such as the docking connector 100 (or the docking connector 50). The support member 132 may also be secured to the docking connector 100 such that the support member 132 may rotate (or pivot) with other components of the docking connector 100.

The extending member 134 may extend upwards from the support member 132. The extending member 134 may be substantially perpendicular to the support member 132. The extending member 134 may have a box-like shape. The extending member 134 may be designed to receive the docking receptacle 160 and thereby provide physical and electrical connections. The extending member 134 (of the docking pole 110) may at least partially correspond to the docking pole 110 discussed above.

FIG. 5 shows the docking pole 130 (and more specifically the extending member 134) having a box-like shape that includes four outer surfaces, including a first outside surface 133, a second outside surface, a third outside surface and a fourth outside surface.

The extending member 134 (of the docking pole 130) may include a plurality of electrical connectors 135 on the first outside surface 133 (or first side surface) of the extending member 134. The plurality of electrical connectors 135 may physically contact electrical connectors of the docking receptacle 160 when the docking receptacle 160 is provided around (or about) the docking pole 110. This may provide an electrical connection between the base 20 and the tablet 10.

The extending member 134 (of the docking pole 130) may include a plurality of electrical connectors on the third outside surface (or third side surface) of the extending member 134. The plurality of electrical connectors on the third outside side may physically contact electrical connectors on the docking receptacle when the docking receptacle 160 is provided around (or about) the docking pole 110. This may provide an electrical connection between the base 20 and the tablet 10.

At least a portion of the docking receptacle 160 may be provided within (or at) the tablet 10. For example, the docking receptacle 160 may be provided at the outer side edge 11 of the tablet 10. The docking receptacle 160 may be provided within the slot 12 or at the slot 12 (or opening) of the tablet 10.

The docking receptacle 160 may have a box-like shape (having four inner surfaces) such that the box-like shape of the docking receptacle 160 may surround the box-like shape (having four outer surfaces) of the docking pole 130. For example, each of the four inner surfaces of the docking receptacle 160 may be immediately adjacent to a different one of the four outer surfaces of the docking pole 130 when the docking receptacle 160 is electrically and/or physically connected to the docking pole 130. This may provide a physical and/or electrical connection between the tablet 10 and the base 20.

FIG. 5 shows the docking receptacle 160 includes a first inside surface 161, a second inside surface 163 (that faces the first inside surface 161), a third inside surface and a fourth inside surface (that faces the third inside surface).

The docking receptacle 160 may include a first plurality of electrical connectors 162 on the first inside surface 161 (of the docking receptacle 160) and a second plurality of electrical connectors 164 on the second inside surface 163 (of the docking receptacle 160). The first plurality of electrical connectors 162 on the first inside surface 161 may be provided in a first specific order (from left to right in FIG. 5), such as contact 1, contact 2, contact 3, ..., contact 8. The second plurality of electrical connectors 164 on the second inside surface 163 may be provided in a second specific order (from left to right in FIG. 5), which is reverse to the first specific order. For example, the second plurality of electrical connectors 164 may be provided in the second specific order of contact 8, contact 7, contact 6, ..., contact 1 (from left to right in FIG. 5). Accordingly, the order of the second plurality of electrical connectors 164 (on the second inside surface 163) is reverse to the order of the first plurality of electrical connectors 162 (on the first inside surface 161).

The docking receptacle 160 may be coupled to (or attached to) the tablet 10. The docking receptacle 160 may rotate, pivot and/or tilt in a same manner and at a same time as the tablet 10.

In a first arrangement (such as the tablet facing in a first direction), the docking receptacle 160 may be provided around the docking pole 130 such that the first plurality of electrical connectors 162 electrically contact the plurality of electrical connectors 135 on the first surface 133 of the extending member 134. In a second arrangement (such as the tablet facing in a second direction), the docking receptacle 160 may be provided around the docking pole 130 such that the second plurality of electrical connectors 164 electrically contact the plurality of electrical connectors 135 on the first surface 133 of the extending member 134. Accordingly, the tablet 10 may change from the first arrangement (or configuration) to the second arrangement (or configuration), and the appropriate connectors of the docking receptacle may be connected to the plurality of electrical connectors 135 of the docking pole 130.

In at least one embodiment, the docking receptacle may include two sets of electrical connectors on separate inside surfaces such that the tablet 10 may be rotated or reversed relative to the base 20 (or relative to part of the docking connector), and proper communication may be provided (or allowed) between the tablet 10 and the base 20. At least one embodiment may provide a single-slot center docking tablet having a reversible docking function.

In at least one embodiment, the tablet 10 may be docked (or mounted) in a forward configuration relative to the base 20 or in a reverse (or backward) configuration relative to the base 20. An electrical connection may be provided using pogo pins and/or spring fingers, for example.

In at least one embodiment, a docking connector may include a locking mechanism to hold the tablet 10 to the docking connector and ensure that the tablet 10 may not be easily released during a clamshell configuration or a convertible configuration.

Figure 6:
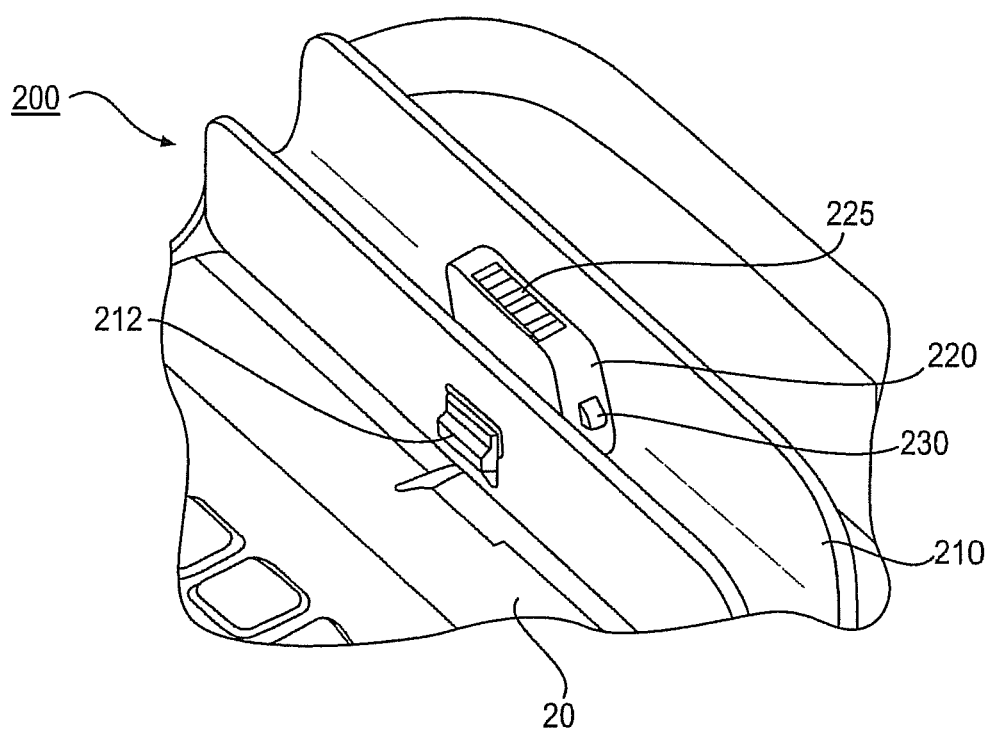
FIG. 6 shows a docking connector according to an example embodiment.

FIG. 6 shows a docking connector according to an example embodiment. Other embodiments and configurations may also be provided.

More specifically, FIG. 6 shows portions of a docking connector 200. The docking connector 200 may correspond to the docking connector 50 and/or the docking connector 100 discussed above. The docking connector 200 may be rotatably coupled (or pivotally coupled) to the base 20, and/or may be detachably coupled to the tablet 10. Another portion of the docking connector 200 (such as a docking receptacle) may be provided at, on or in the tablet 10.

The docking connector 200 may be provided between the tablet 10 and the base 20 to allow the tablet 10 to attach (or mount) to the base 20. The docking connector 200 may include a docking cover 210 (or cover member). As shown in FIG. 6, the docking cover 210 may be U-shaped so as to receive the tablet 10 within the U shape. The docking cover 210 may be formed of plastic, for example. The cover 210 may correspond to the cover 102 discussed above.

The outer side edge 11 of the tablet 10 may be received within the cover 210 so as to dock (or mount) the tablet 10 to the docking connector 200 (and to the base 20). The docking connector 200 may be provided in a substantially center of a width of the base 20. More specifically, the docking connector 200 may be provided at an area of the handle opening 125 and at a central width area of the base 20.

The docking connector 200 may include a docking pole 220 provided at a central area of the cover 210. The docking pole 220 may be also called a docking member or a docking plug. The docking pole 220 may extend upwards from the U-shaped cover 210. The docking pole 220 may have a box-like shape.

A portion of the tablet 10 (and/or another component of the docking connector 200) may be provided around the docking pole 220 when the tablet 10 is docked (or mounted) to the docking pole 220 (and/or to the base 20).

The docking connector 200 may include a release latch 212 (or release member) on an outside surface of the cover 210. The release latch may also be called a release button. The release latch 212 may be pressed to disconnect the tablet 10 from the docking connector 200 (and/or from the base 20).

FIG. 6 also shows a plurality of electrical connectors 225 on a top edge surface of the docking pole 220. The plurality of electrical connectors 225 may be pogo pin connectors. In one embodiment, the plurality of connectors 225 may be female connectors. The plurality of electrical connectors 225 may be provided on a board, for example. As will be discussed with respect to FIG. 8, the plurality of electrical connectors 225 on the docking pole 220 may include a first row of electrical connectors and a second row of electrical connectors.

FIG. 6 also shows a first lock hook 230 on a first side edge of the docking pole 220. A second lock hook may be provided on a second side edge of the docking pole 220. The first and second lock hooks may move based on a docking receptacle being guided down the docking pole 220.

Figure 7:
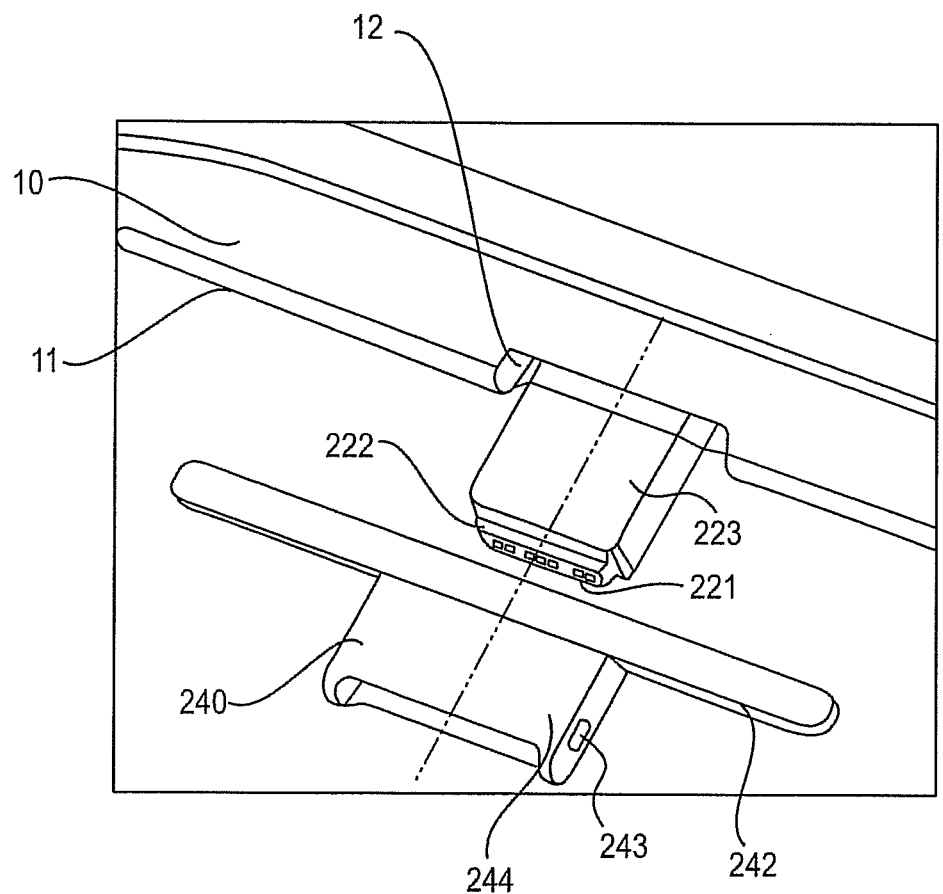
FIG. 7 shows portions of a docking connector according to an example embodiment.

FIG. 7 shows portions of a docking connector according to an example embodiment. FIG. 7 shows a docking receptacle according to an example embodiment. Other embodiments and configurations may also be provided.

FIG. 7 shows components of a docking receptacle that may be provided at the tablet 10. These components may provide docking (or mounting) of the tablet 10 to the components of the docking connector 200 (and to the base 20).

FIG. 7 shows that the docking receptacle may include a plurality of electrical connectors 221 on a board 222 that is coupled to a flexible printed circuit (FPC) flex 223. The docking receptacle may also include a support guide member 240 (or a support groove member).

The plurality of electrical connectors 221 may be pogo pin connectors. In one embodiment, the plurality of electrical connectors 221 may be male connectors.

FIG. 7 shows the docking receptacle provided outside the tablet 10 and in a separated manner. However, when mounted to the tablet 10, the support guide member 240 may be at least partially provided in the tablet 10 and may partially extend from the slot 12. The following description may describe components as if the components were coupled to the tablet 10.

The support guide member 240 may include a support member 242 and an extending member 244.

The support member 242 may be provided within the slot 12 (or opening) of the tablet 10 to support the docking receptacle. The support member 242 may be physically coupled (or attached) to the tablet 10 (such as inside the slot 12).

The extending member 244 may extend from the support member 242 to outside the slot 12 (or opening) of the tablet 10. The extending member 244 may be substantially perpendicular to the support member 242. The extending member 244 may be designed to be provided around or about the docking pole 220 when the tablet 10 is mounted to the docking connector 200.

The extending member 244 may have a box-like shape (having four inner surfaces) such that the box-like shape of the extending member 244 may surround the box-like shape (having four outer surfaces) of the docking pole 220. For example, each of the four inner surfaces of the extending member 244 may be immediately adjacent to a different one of the four outer surfaces of the docking pole 220 when the extending member 244 is electrically and/or physically connected to the docking pole 220. This may provide a physical connection between the tablet 10 and the base 20.

The plurality of connectors 221 (and the FPC flex 223) may extend through at least a portion of the support guide member 240 (including through the support member 242 and a portion of the extending member 244) such that the plurality of connectors 221 (of the docking receptacle) may couple to at least a portion of the plurality of connectors 225 (on the docking pole 220).

When the docking receptacle at the tablet 10 is coupled to the docking pole 220, the support guide member 240 may be provided around (or about) the docking pole 220. The support guide member 240 may guide the tablet 10 in a proper direction and orientation so as to become physically and electrically supported. The support guide member 240 may include a first opening 243 on a first side and a second opening on a second side. The first opening 243 may receive a portion of the first lock hook 230 (on the docking pole 220), and the second opening may receive a portion of the second lock hook (on the docking pole 220).

Once the support guide member 240 reaches the first lock hook 230 (FIG. 7), the first lock hook 230 may be inserted into the docking pole 220. In other words, the support guide member 240 may push the first lock hook 230 in an inward manner with respect to the docking pole 220 and the support guide member 240 may push the second lock hook inward with respect to the docking pole 220. The first lock hook 230 and the second lock hook are spring loaded to move outward when the first lock hook 230 is provided at the first opening 243 (on the support guide member 240) and the second lock hook 230 is provided at the second opening (on the support guide member 240).

Figure 8:
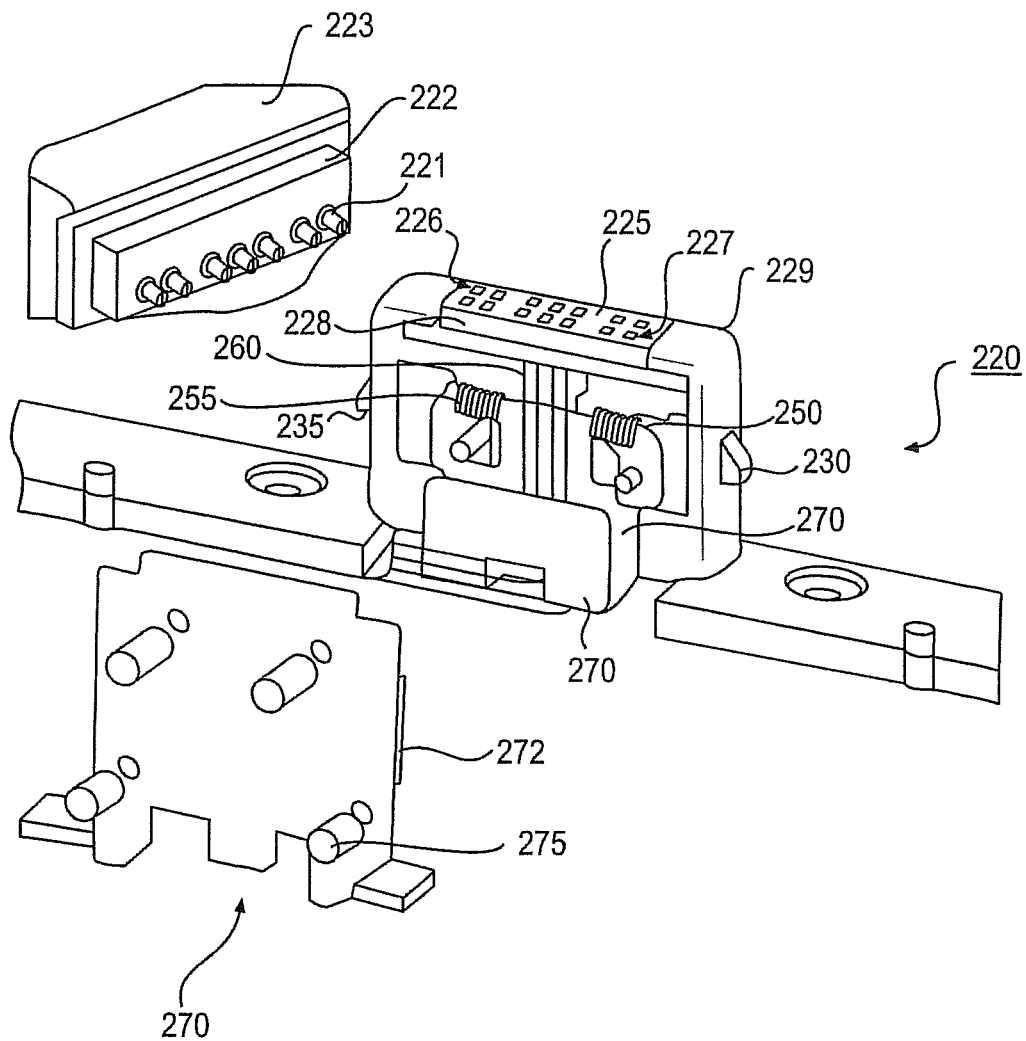
FIG. 8 shows a docking connector according to an example embodiment.

FIG. 8 shows a docking connector according to an example embodiment. Other embodiments and configurations may also be provided.

FIG. 8 shows components previously discussed with respect to FIGS. 6-7.

More specifically, FIG. 8 shows the docking pole 200 includes the plurality of electrical connectors 225 on a board 228. The plurality of electrical connectors 225 may include a first row 226 of connectors on the board 228 and a second row 227 of connectors on the board 228. The first and second rows 226, 227 of connectors are provided on the docking pole 220 such that the connectors 221 (of the docking receptacle) may be inserted into either the first row 226 of connectors (on the docking pole 220) or into the second row 227 of connectors (on the docking pole 220).

FIG. 8 also shows the first lock hook 230 (such as a right hook) and a second lock hook 235 (such as a left hook) on or at the docking pole 220. The first and second lock hooks 230, 235 may be pushed inwardly when the support guide member 240 is moved downward and around the docking pole 220.

FIG. 8 also shows a first spring 250 (corresponding to the first lock hook 230) and a second spring 255 (corresponding to the second lock hook 235) within the docking pole 220. The first spring 250 may apply a force to push the first lock hook 230 outwards from the docking pole 220 when the first opening 243 of the support guide member 240 is aligned with the first lock hook 230. The second spring 255 may apply a force to push the second lock hook 235 outwards from the docking pole 220 when the second opening of the support guide member 240 is aligned with the second lock hook 235.

A plurality of cables 260 may also be provided within the docking pole 220. The cables 260 may extend from the plurality of electrical connectors 225 to allow communication with components within the base 20.

FIG. 8 also shows a guide plate 270 that includes a pole front 272 and a pole back. The guide plate 270 may be provided within or at the docking pole 220. A plurality of screws 275 (or other devices) may be provided on the pole front 272 of the guide plate 270. When the first lock hook 230 and the second lock hook 235 are pushed inward (by the support guide member 240), the guide plate 270 may move in a downward manner to release the lock of the docking receptacle to the docking pole 220. The tablet 10 may thereby be released from the docking pole 220 (and from the base 20).

When the docking receptacle (and the tablet 10) is mounted to or at the docking pole 220, the plurality of electrical connectors 221 (on the docking receptacle) may contact (or electrically touch) one row of the plurality of electrical connectors 225 on the docking connector 220. When the docking receptacle is mounted to or at the docking pole 220, the first lock hook 230 and the second lock hook 235 on the docking pole 220 may automatically spring outwards from the docking pole 220 into the first opening 243 and the second opening of the support guide member 240. This may lock the support guide member 240 to the docking pole 200. Accordingly, the tablet 10 may be mounted to or at the docking connector 200 (and to the base 20).

In order to remove the tablet 10 (and the docking receptacle) from the docking connector 200, a user may press the release latch 212 (or release button) on the docking cover 210. This may cause the first lock hook 230 and the second lock hook 235 to be automatically pulled (or inserted) into the docking pole 220. This may release the locking of the docking receptacle from the docking connector 200. The tablet 10 (and the docking receptacle) may then be pulled off of the docking connector 200.

In at least one embodiment, an electronic device and/or a docking connector may include a ball-detent mechanism and a magnetic latch (or magnetic device). This may allow a single slot center docking having a small footprint.

A ball-detent mechanism may hold a moving component in a temporary fixed position relative to another component. The moving components may slide with respect to each other. For example, a ball, such as a metal sphere, may slide within a bored cylinder. Against a pressure of a push-slide that may push the ball against another part of the mechanism, the mechanism may have a detent. In at least one embodiment, the detent may be a hole, a slot or an opening. When the hole is in line with the cylinder, then the ball may fall partially into the hole under pressure of the slide, thereby holding components at that position.

Figure 9:
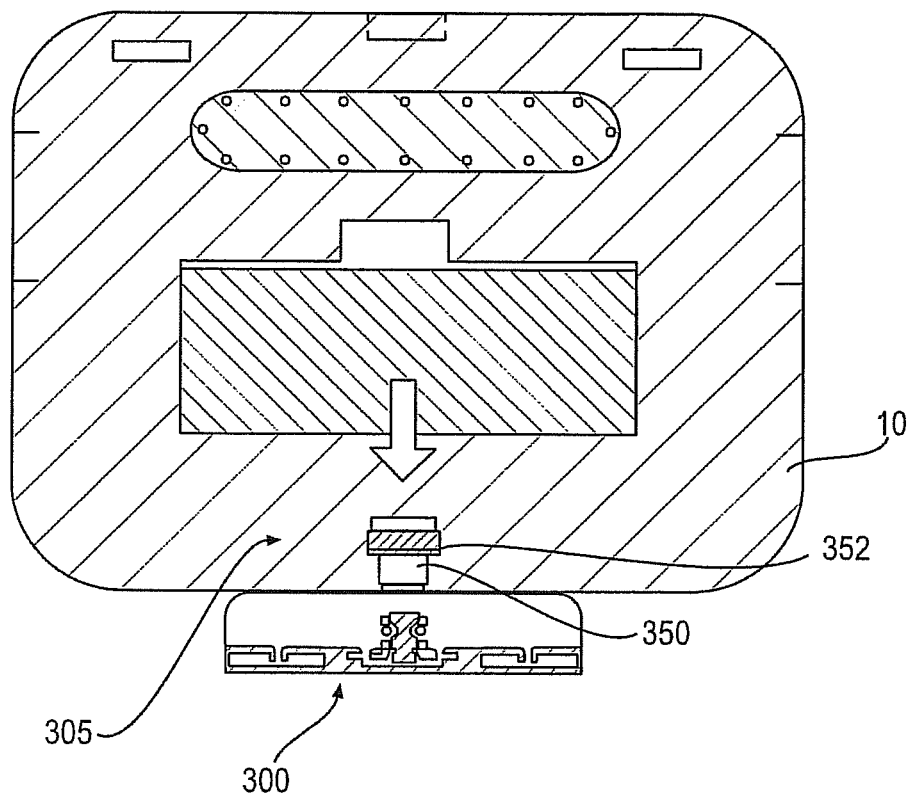
FIG. 9 shows a portion of a docking connector (or a tablet) being inserted into a portion of docking connector according to an example embodiment.

FIG. 9 shows a portion of a docking connector (or a tablet) being inserted into a portion of a docking connector according to an example embodiment. Other embodiments and configurations may also be provided.

FIG. 9 is a section view of a middle plane of docking between a docking receptacle 305 (on the tablet 10) and a docking pole mechanism 300 (on the base 20). The arrow shown in FIG. 9 represents movement of the tablet 10 toward the docking pole mechanism 300.

The docking connector may include the docking receptacle 305 and the docking pole mechanism 300.

In at least one embodiment, the docking receptacle 305 is provided at the tablet 10, and the docking connector includes the docking pole mechanism 300 (or docking pole).

FIG. 9 shows the tablet 10 (and the docking receptacle 305) being inserted in a downwards manner (as shown by the arrow) to the docking pole mechanism 300. Components of the docking pole mechanism 300 may correspond to components of the docking connector 50 and/or components of the docking connector 100 as discussed above. The docking pole mechanism 300 may be coupled to the base 20, and the docking pole mechanism 300 may be detachably coupled to the tablet 10 such that the tablet 10 may be in a locked status (or state) or a separated status (or state) with respect to the docking connector (and/or the base 20).

The docking pole mechanism 300 may be provided at a docking cover. The docking cover may be U-shaped. The docking cover (or the docking connector) may rotate relative to a base (such as the base 20). The docking pole mechanism 300 may be fixed to the docking cover (U-shaped), and the docking pole mechanism 300 may not rotate relative to the docking cover (U-shaped).

The docking receptacle 305 may be provided on or at the tablet 10. The docking receptacle 305 may be considered as part of the docking connector. The docking receptacle 305 may physically and electrically connect to the docking pole mechanism 300 when the tablet 10 is moved in a downwards manner as shown by the arrow.

The docking receptacle 305 may include a slot 350 and a magnetic device 352 (or magnetic block). The slot 350 may be received around or about a docking pole (such as on the docking pole mechanism), for example. The slot 350 may be a metal slot, for example.

Figure 10:
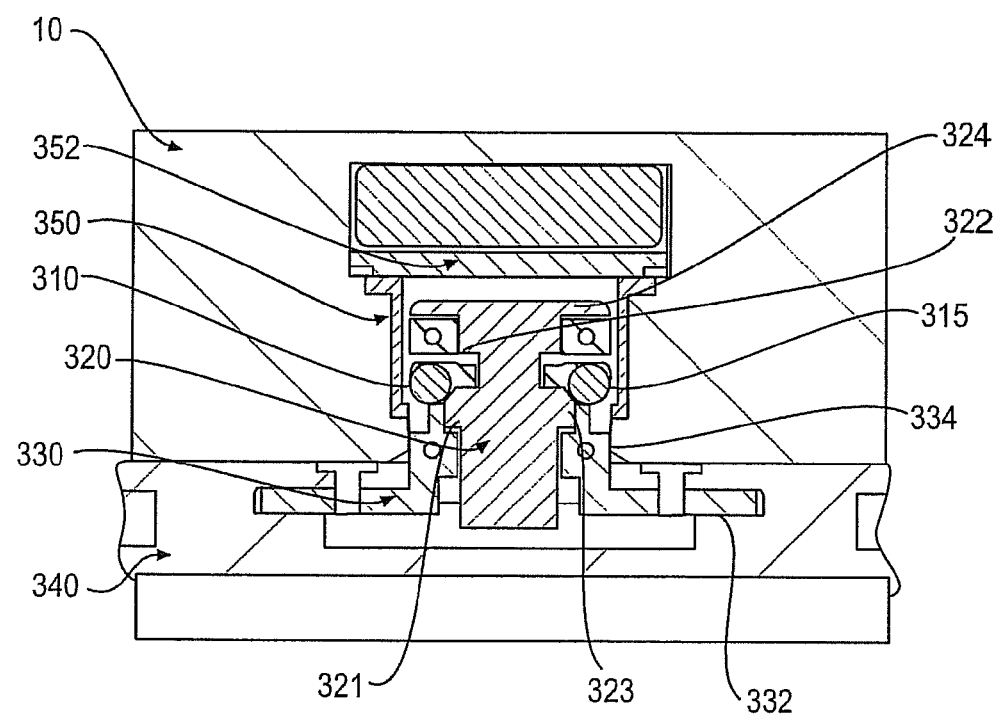
FIG. 10 is a close up view of a tablet being docked according to an example embodiment.
Figure 11:
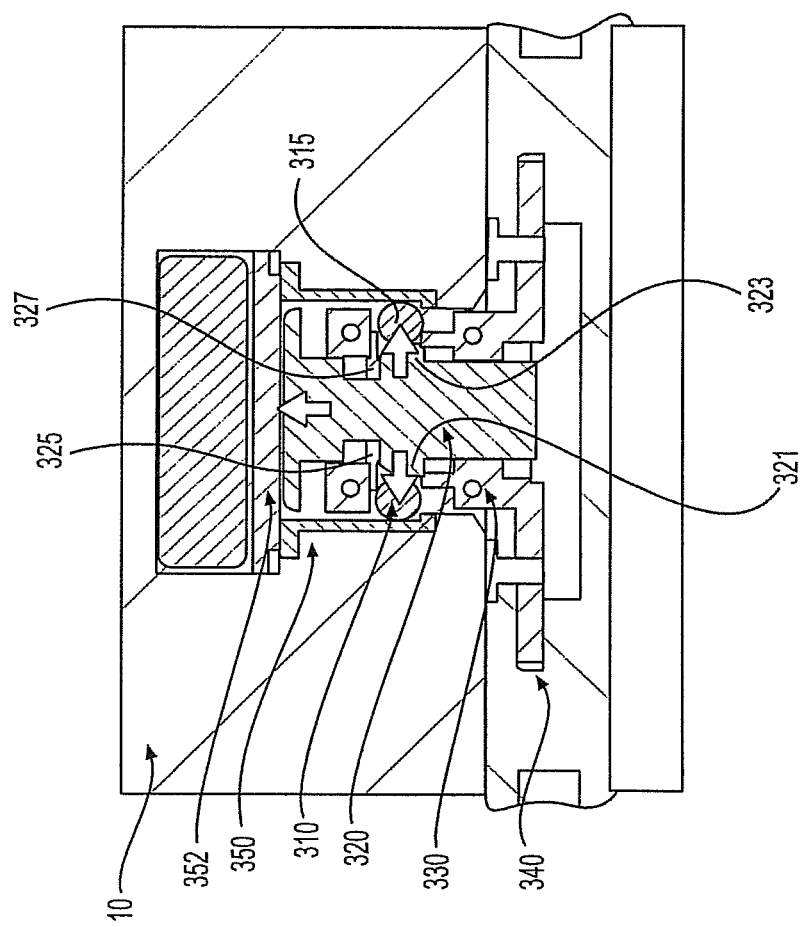
FIG. 11 shows a tablet in a locked status according to an example embodiment.

Features of the docking receptacle 305 and the docking pole mechanism 300 may be shown and described with respect to FIGS. 10-11.

FIG. 10 is a close up view of the tablet 10 being docked using the docking receptacle 305 and the docking pole mechanism 300 according to an example embodiment. Other embodiments and configurations may also be provided.

FIG. 10 shows the slot 350 being provided around or about components of the docking pole mechanism 300, such as around or about a docking pole.

The docking pole mechanism 300 may include a docking support 340 that may support other components of the docking pole mechanism 300. The docking support 340 may be mounted to the base 20 and/or may be rotatable (or pivotable) with respect to the base 20.

As discussed above, the docking pole mechanism 300 may be provided at a docking cover, which may rotate relative to a base.

The docking pole mechanism 300 may include a docking pole 330 provided on (or in) the docking support 340, which may be mounted to a docking cover. The docking pole 330 may also be called a dock or dock port. The docking pole 330 may have a box-like shape, including inner surfaces.

The docking pole 330 may include a support member 332 and an extending member 334. The docking pole 330 (or the dock) may be made of metal.

The support member 332 may be partly provided in the docking support 340 to support the docking pole mechanism 300. The docking support 340 may be considered as part of a docking cover that rotates relative to a base.

The extending member 334 may extend upwards from the support member 332. The extending member 334 may be substantially perpendicular to the support member 332. The extending member 334 may have a box-like shape, including inner surfaces. The extending member 334 (of the docking pole mechanism 300) may be designed to receive the docking receptacle 305 and thereby provide physical and electrical connections. Components of the extending member 334 (of the docking pole 330) may correspond to components of the docking pole 110 and/or components of the extending member 134 discussed above.

The docking pole mechanism 300 may also include a slider 320 provided within the docking pole 330. The slider 320 may be made of iron, for example. The slider 320 may move upwards and downwards within the docking pole 330 based on a magnetic force and/or by gravity. For example, the magnetic device 352 (of the docking receptacle 305) may magnetically attract the slider 320. The magnetic device 352 may cause the slider 320 to move toward the magnetic device 352 based on a magnetic force between the magnetic device 352 and the slider 320.

The docking pole mechanism 300 may include a first ball 310 provided within or at a first surface of the extending member 334, and a second ball 315 provided within or at a second surface of the extending member 334. The first and second balls 310 and 315 may be stainless steel balls, for example.

The slider 320 includes a first slot 322 and a first protrusion 321 on a first side of the slider 320. The first protrusion 321 may be immediately below the first slot 322 on the slider 320. The slider 320 also includes a second slot 324 and a second protrusion 323 on a second side of the slider 320. The second protrusion 323 may be immediately below the second slot 324 on the slider 320.

FIG. 10 shows the first ball 310 provided at or partially in the first slot 322 of the slider 320, and the second ball 315 provided at or partially in the second slot 324 of the slider 320.

As the slot 350 (of the docking receptacle 305) is guided downward by the extending member 334 (of the docking pole 330), the magnetic device 352 and the slider 320 may become closer and closer. A magnetic force between the magnetic device 352 and the slider 320 may move the slider 320 in an upwards direction toward the magnetic device 352. That is, the magnetic device 352 may create an automatic force that actuates (or causes) the slider 320 to move upwards. The upward movement of the slider 320 may cause the first protrusion 321 to push the first ball 310 outward (from the first slot 322) and cause the second protrusion 323 to push the second ball 315 outward (from the second slot 324). As shown in FIG. 11, the first protrusion 321 may abut against an edge 325 of the docking pole 320 and the second protrusion 323 may abut against an edge 327 of the docking pole 320, which may lock the docking receptacle 305 (of the tablet 10) to the docking pole mechanism 300 (and to the base 20).

FIG. 11 shows the tablet 10 in a locked configuration (or locked status) according to an example embodiment. Other embodiments and configurations may also be provided.

More specifically, FIG. 11 shows that the slider 320 has been moved upward (shown by the arrow) due to the magnetic force between the magnetic device 352 (of the docking receptacle 305) and the slider 320. FIG. 11 also shows the first ball 310 being pushed outward (shown by arrow pointing left) by the first protrusion 321 (of the slider 320), and the second ball 315 being pushed outward (shown by arrow pointing right) by the second protrusion 323 (of the slider 320). The tablet 10 may be considered to be in a locked configuration (or locked status or locked state) since the first protrusion 321 abuts against the edge 325 of the docking pole 320 and the second protrusion 323 abuts against the edge 327 of the docking pole 320.

FIG. 11 shows that the magnetic device 352 may automatically actuate the slider 320 in an upwardly manner (as shown by the arrow). The first and second balls 310, 315 may be pushed outwardly by the slider 320 (i.e., the first and second protrusions 321, 323) to lock the tablet 10 (to the base 20, for example).

Figure 12:
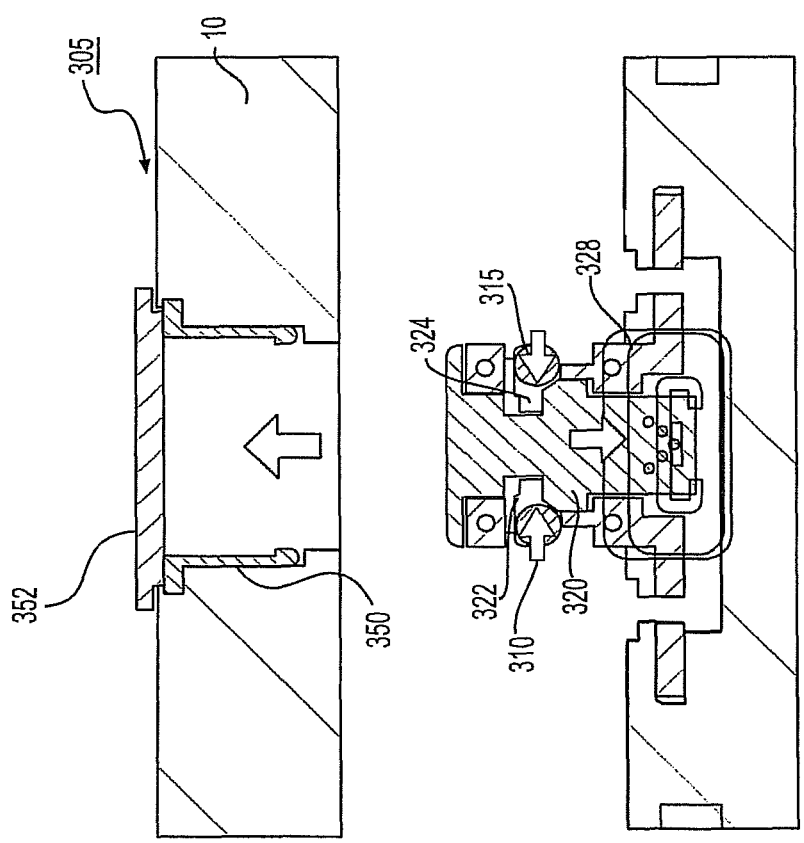
FIG. 12 shows a release of a tablet from a docking connector according to an example embodiment.

FIG. 12 shows a release of a portion of a docking connector (or a tablet) from the docking connector according to an example embodiment. Other embodiments and configurations may also be provided.

As one example, FIG. 12 shows a release of the docking receptacle from the docking connector (such as the docking pole).

In order to facilitate a release of the tablet 10, a button 328 (or release button) attached to the slider 320 may be depressed, which causes the slider 320 to move in a downward manner away from the magnetic device 352, as shown by the downward facing arrow. This may cause the first ball 310 to return into (or return partially back into) the first slot 322 (of the slider 320), and cause the second ball 315 to return into (or return partially back into) the second slot 324 (of the slider 320).

When the slider 320 is moved in a downward manner (shown by downward arrow) based on depression of the button 380 (or based on another type of input), the first and second balls 310 and 315 have free movement, which allows the docking receptacle 305 (on the tablet 10) to automatically disengage from the docking pole mechanism 300 (and/or from the base 20).

FIG. 12 shows that the button 328 (or other type of input) may be depressed (or pressed down) and the slider 320 may be pulled in a downward manner. The first and second balls 310, 315 may freely return inwardly (shown by the left and right arrows) of walls of the docking pole 320. The tablet 10 may thereby be released from the docking pole 320 (and from the base 20).

Embodiments may provide a tablet release from a base (or docking connector) by providing a touch panel function together with an electric magnetic ball detent mechanism. A software user interface may allow one hand docking and/or one hand release.

Figure 13:
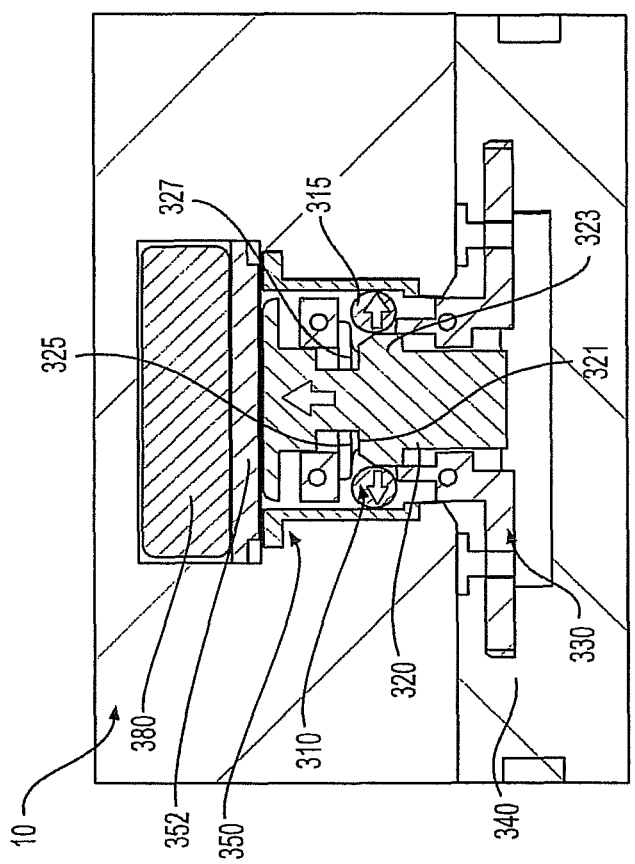
FIG. 13 shows a docking connector according to an example embodiment.

FIG. 13 shows a docking connector according to an example embodiment. FIG. 13 also shows the tablet 10 in a locked configuration (or locked status or locked state). Other embodiments and configurations may also be provided.

More specifically, FIG. 13 shows similar components as discussed above with respect to FIGS. 10-12. FIG. 13 also shows that the docking receptacle 305 includes an electric magnetic (EM) component 380 (or EM device) to receive electrical power from a battery (or other power source), for example. FIG. 13 shows an example of the electric magnetic component 380 when the power is off (to the EM component 380) such that the slider 320 may be magnetically attracted upward to the magnetic device 352. The upward arrow represents upward movement of the slider 320 toward the magnetic block 352.

In the locked configuration (or locked status) of the tablet 10, the electrical magnetic component 380 may be powered off (i.e., not powered). FIG. 13 shows the slider 320 in an upward position, which causes the first protrusion 321 to push the first ball 310 outward (as shown by left arrow) and causes the second protrusion 323 to push the second ball 315 outward (as shown by right arrow). The tablet 10 may be locked (or in a locked state) based on the first protrusion 321 abutting against the edge 325 of the docking pole 320 and the second protrusion 323 abutting against the edge 327 of the docking pole 320. The magnetic device 352 may maintain the slider 320 in the upward position since the electric magnetic component 380 is not powered.

Logic and/or programs may contain instructions to perform various operations, such as power the EM component 380 on or off. These instructions may occur based on a type of input. The instructions may be provided on a computer-readable medium, and/or may be used by a processor or other device, such as within the tablet 10.

Figure 14:
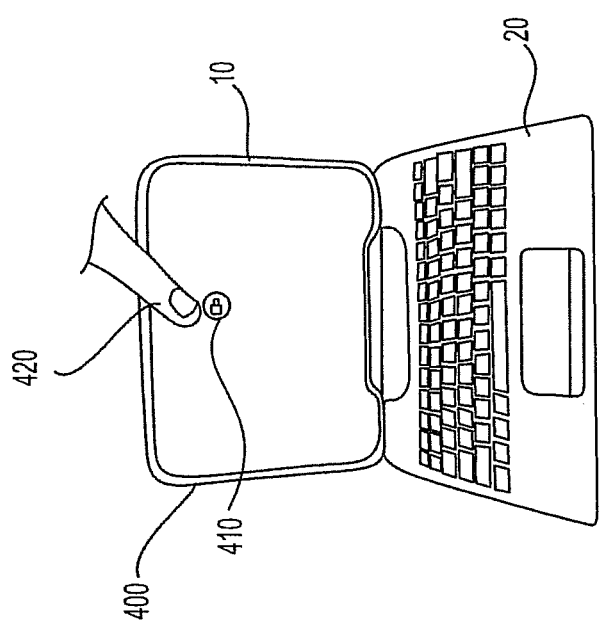
FIG. 14 is a front view of an electronic device in which an icon is displayed on a tablet to provide a release of the tablet from a component of a docking connector according to an example embodiment.

FIG. 14 is a front view of an electronic device in which an image (or an icon) is displayed on a tablet 10 to provide a release (or disengagement) of the tablet 10 from a component of a docking component according to an example embodiment. Other embodiments and configurations may also be provided.

FIG. 14 shows the tablet 10 being released (or disengaged) from a locked status (or position). As shown in FIG. 14, the tablet 10 may include a touch panel 400 (or a touch screen) as the display 5. The touch panel 400 may display an image 410 (or icon) to release (or disengage) the tablet 10 from a docking connector. The image 410 may be called a release image.

A user may touch (or contact) the icon 410 on the touch panel 400 and perform a sliding action over the touch panel 400. For example, the user may touch (or contact) the image 410 (or icon) using a finger 420 and slide the finger 420 upwards from the image 410 while still contacting the touch panel 400. This action may release (or disengage) the tablet 10 (or docking receptacle) from the docking pole of the docking connector (and from the base 20). The action may occur based on logic, instructions or code provided (or to be provided) in the tablet 10.

In at least one embodiment, after the finger 420 slides the image 410 upward (or the finger 420 moves upward from the image 410), then software (such as within the tablet 10) may provide a signal to hardware so as to power on the electric magnetic component 380, and thereby create an electric magnetic force that is equal to or greater than an original magnetic device force. Logic, code and/or instructions within the tablet 10 may automatically provide the signal. The slider 320 may lose a lift force from the magnetic device 352 and allow the slider 320 to automatically drop downwardly due to gravity. This may free the ball detent discussed below, and the tablet 10 (or docking receptacle) may be released (or disengaged) from components of the docking pole of the docking connector (and/or from the base 20).

The electric magnetic component 380 may provide a magnetic force stronger than the magnetic force between the magnetic device 352 and the slider 320. A power supply may supply power to the electric magnetic component 380. When power is supplied to the electric magnetic component 380, the slider 320 may be released (or disengaged) from the magnetic device 352 and move away from the magnetic device 352 (such as by gravity).

The tablet 10 may include logic to receive a touch input on the display (or touch panel 400) with respect to the image 410 (or release image). In response to receiving the touch input at the display, power may be provided (or supplied) to the electric magnetic component and the slider 320 may be released (or disengaged) from the magnetic device 352 and move away from the magnetic device 352 (such as by gravity).

In at least one embodiment, logic may be executed based on hardware to automatically disengage the docking receptacle from the docking connector in response to a touch input at the display.

In at least one embodiment, instructions may be provided on a non-transitory computer readable medium. The instructions may display an image on the display, and in response to a touch input relative to the displayed image, to automatically disengage the display portion from the base portion.

Figure 15:
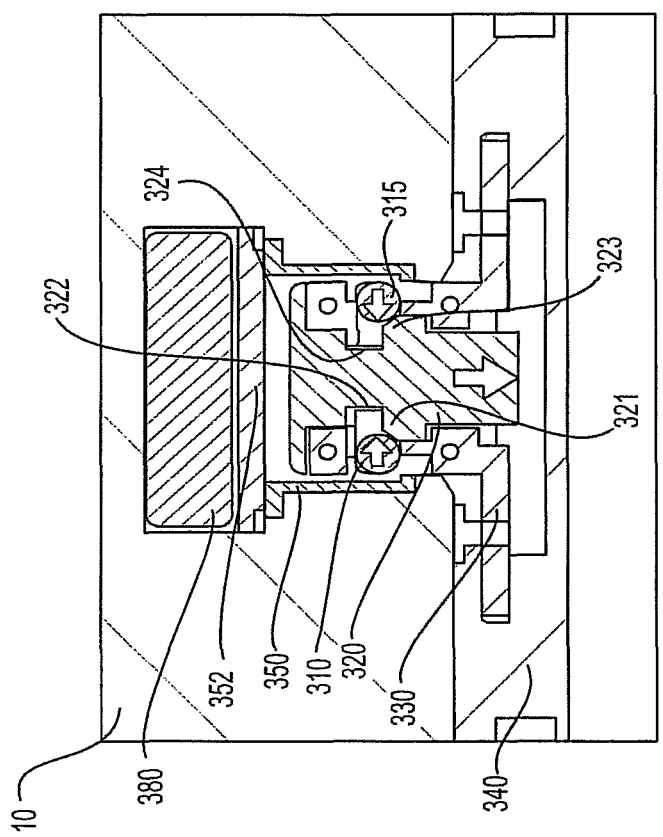
FIG. 15 shows a release of a tablet from a docking connector according to an example embodiment.

FIG. 15 shows a release of a portion of a docking connector (or a tablet) from a portion of a docking connector according to an example embodiment. Other embodiments and configurations may also be provided.

FIG. 15 also shows an example of the electric magnetic component 380 being powered on, such as from a power supply, and the slider 320 automatically moving downwardly due to gravity (shown by the downward arrow).

Other actions may be used to release the tablet 10 using a one finger action. For example, the user may use a straight slide motion or a rotate action on the touch panel 400 in order to release the docking receptacle 305 (on the tablet 10) from the docking pole 320. A physical switch or a button may also be provided on a top side of the tablet 10 in order to release the tablet 10 from the base. Additionally, the user may utilize a finger print sensor in order to release (or disengage) the tablet 10 (or the docking receptacle).

Figure 16:
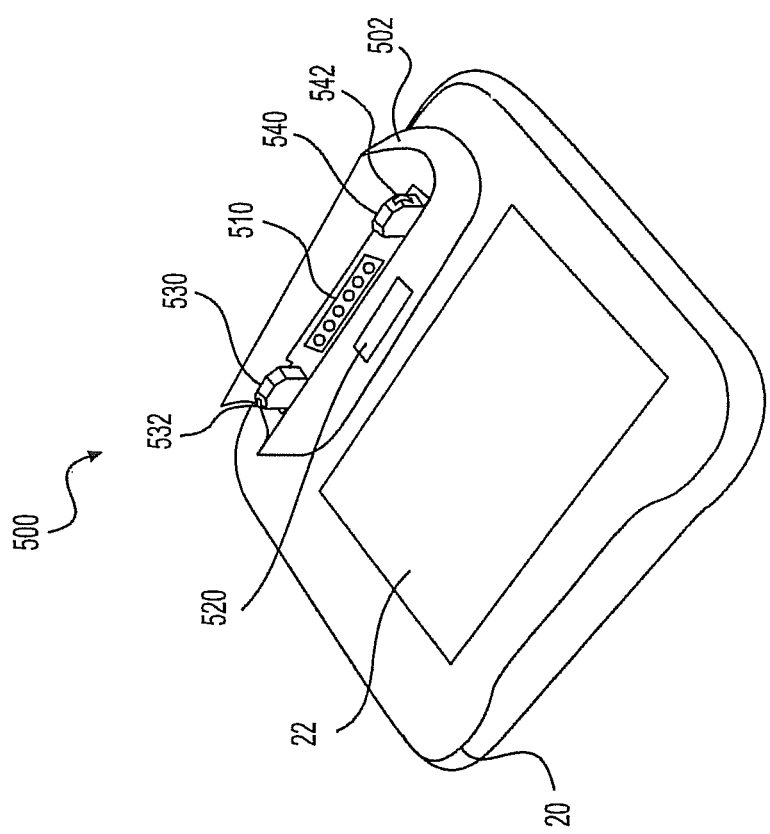
FIG. 16 shows a portion of a docking connector according to an example embodiment.
Figure 17:
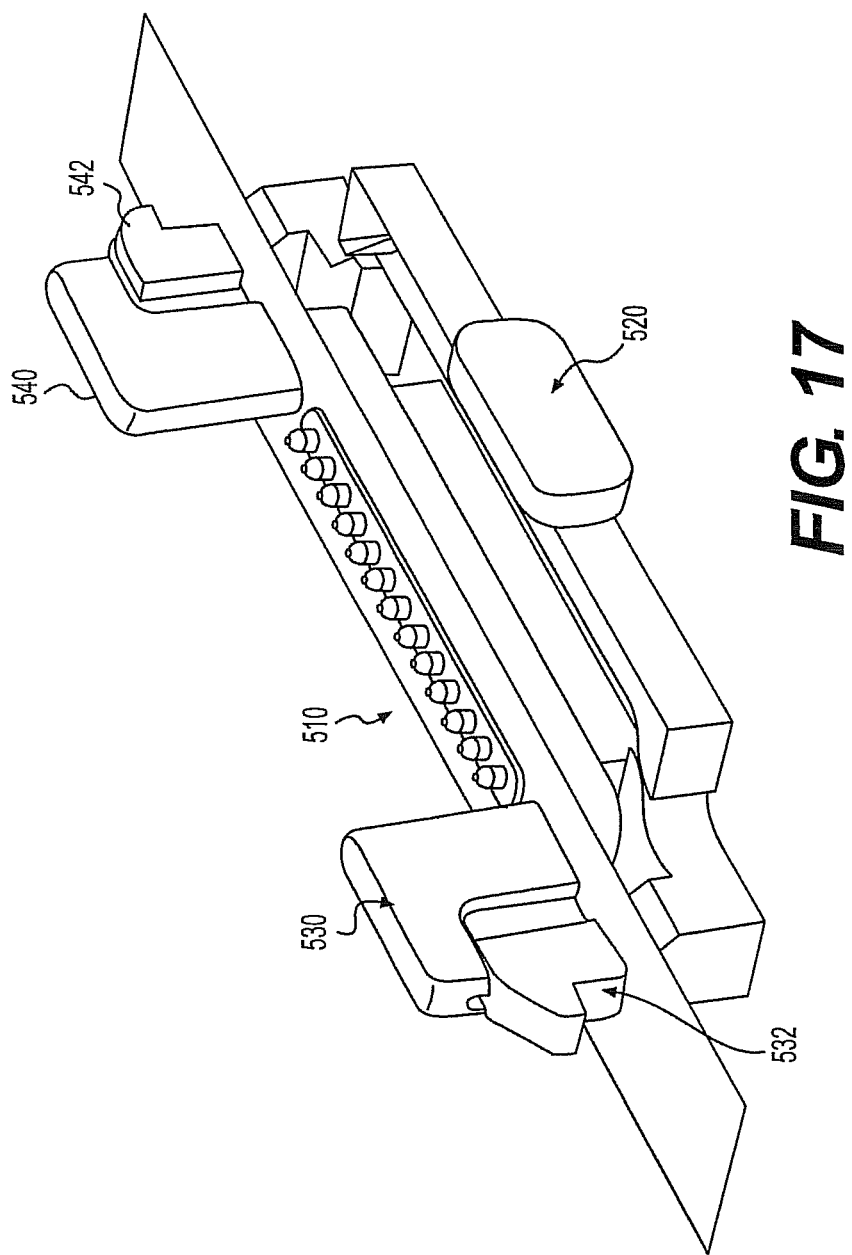
FIG. 17 shows a portion of a docking connector according to an example embodiment.
Figure 18:
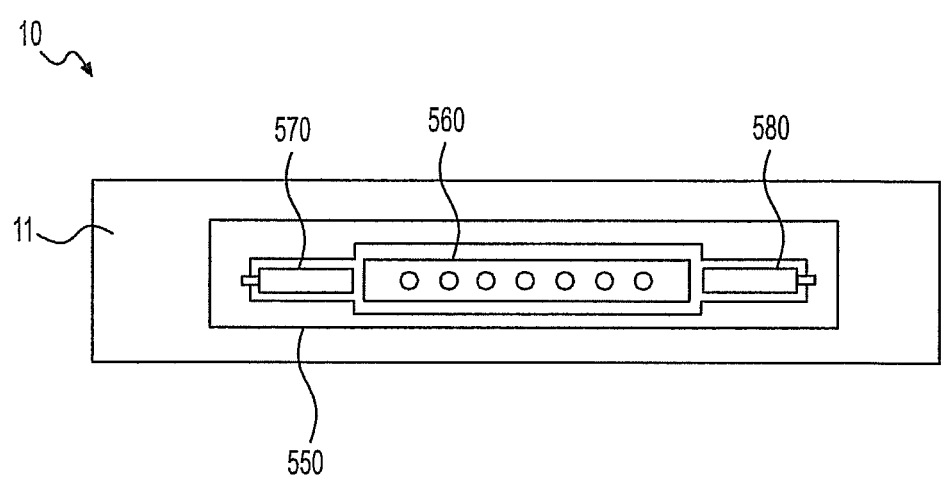
FIG. 18 shows a portion of a docking connector according to an example embodiment.

FIG. 16 shows a portion of a docking connector at a base according to an example embodiment. FIG. 17 shows a portion of a docking connector according to an example embodiment. FIG. 18 shows a portion of the docking connector at a tablet according to an example embodiment. Other embodiments and configurations may also be provided.

More specifically, FIG. 16-17 show portions of a docking connector 500. The docking connector 500 may correspond to any of the docking connectors discussed above. The docking connector 500 may rotate or pivot relative to the base 20. Another portion of the docking connector 500 (such as a docking receptacle) may be provided at, on or in the tablet 10.

The docking connector 500 may be provided between the tablet 10 and the base 20 to allow the tablet to attach (or mount) to the base 20. The docking connector 500 may include a cover 502 (or cover member). As shown in FIG. 16, the cover 502 may be U-shaped so as to receive the tablet within the U-shape. The cover 502 may be formed of plastic, for example.

FIG. 18 shows the outer side edge 11 of the tablet 10. The outer side edge 11 of the tablet 10 may be received within the cover 502 so as to dock (or mount) the tablet 10 to the docking connector 500 (and to the base 20).

The cover 502 may be rotatably coupled to the base 20. The cover 502 may pivot (or rotate) relative to the base 20. This may occur when the cover 502 is tilted relative to the base 20. For example, the cover 502 (or the docking connector 500) may pivot (or rotate) when the outer side edge 11 of the tablet 10 is received within the cover 502 and the tablet 10 is physically moved (or rotated) in a forward direction or a rear direction.

The docking connector 500 may be provided in a substantially center of a width of the base 20. More specifically, the docking connector 500 may be provided at an area of a handle opening and at a central width area of the base 20.

The docking connector 500 may include a first docking pole 530, plurality of connectors 510 and a second docking pole 540. The plurality of connectors 510 may be pogo pins to electrically connect with connectors on a docking receptacle. The first docking pole 530 may be at a first end (or first side) of the plurality of connectors 510, and the second docking pole 540 may be at a second end (or second side) of the plurality of connectors 510.

The first docking pole 530 may extend upwards from the U-shaped cover 502 (or docking cover). The second docking pole 540 may extend upwards from the U-shaped cover 502.

The first docking pole 530 may include a first hook 532 that extends from an outside edge of the first docking pole 530 (in a direction away from the plurality of connectors 510). The second docking pole 540 may include a second hook 542 that extends from an outside edge of the second docking pole 540 (in a direction away from the plurality of connectors 510).

FIGS. 16-17 also show a button 520, such as a release button. The depression of the button 520 causes the first hook 532 and the second hook 542 to release/disengage (or to bend down) from a docking receptacle. The disengagement may occur based on other actions based on logic, code or instruction in the tablet 10 (or to be provided into the tablet 10).

FIG. 18 shows a docking receptacle 550 provided on the outer side edge 11 of the tablet 10. The docking receptacle may include a first hook receptacle 570, a second hook receptacle 580 and a plurality of connectors between the first hook receptacle 570 and the second hook receptacle 580.

The docking receptacle 550 may engage with components shown in FIGS. 16-17 to provide an electrical connection between the base 20 and the tablet 10. For example, the first hook receptacle 570 may receive the first docking pole 530 and the first hook 532 may engage with an edge inside the first hook receptacle 570. The second hook receptacle 580 may receive the second docking pole 540 and the second hook 542 may engage with an edge inside the second hook receptacle 580. The plurality of connectors 510 (on the cover 502) may be electrically connected to the plurality of connectors 560 (on the docking receptacle 550).

Upon pressing (or depression) of the button 520 (or other type of input), the first hook 532 may disengage from the edge within the first hook receptacle 570 and the second hook 542 may disengage from the edge within the second hook receptacle 580. The tablet 10 may then be lifted off of the base 20. The docking receptacle may be automatically disengaged from the docking connector based on an input.

The embodiment(s) shown in FIGS. 16-18 may allow for a one-handed removal of the tablet 10, by pushing the button 520 (or other type of input) and then pulling off the tablet 10.

An embodiment may include an electronic device that includes a base portion, a display portion and a docking connector. The base portion may have an input device. The display portion having a display, a docking receptacle with a plurality of second connectors. The docking connector to move relative to the base portion. The docking connector may include a first docking pole to extend from the docking connector and to engage with the docking receptacle, and a plurality of first electrical connectors.

The plurality of second electrical connectors may include a first set of connectors at a first inner surface of the docking receptacle, and a second set of connectors at a second inner surface of the docking receptacle.

The first set of connectors at the first inner surface of the docking receptacle may contact the plurality of first electrical connectors at a side surface of the first docking pole when the docking receptacle is provided at the first docking pole in a first configuration. The second set of connectors at the second inner surface of the docking receptacle may contact the plurality of first electrical connectors at the side surface of the first docking pole when the docking receptacle is provided at the first docking pole in a second configuration.

The plurality of first electrical connectors may include a first set of connectors at an edge surface of the first docking pole and a second set of connectors at the edge surface of the first docking pole.

The plurality of second electrical connectors at the docking receptacle may contact the first set of connectors at the edge surface of the first docking pole when the docking receptacle is provided at the first docking pole in a first configuration, and the plurality of second electrical connectors at the docking receptacle may contact the second set of connectors at the edge surface of the first docking pole when the docking receptacle is provided at the first docking pole in a second configuration.

A second docking pole may extend from the docking connector, and the plurality of first electrical connectors may be between the first docking pole and the second docking pole.

A release button at the docking connector may release the docking receptacle from the first docking pole and the second docking pole.

The first docking pole may include a first latch hook and the second docking pole includes a second latch hook. The first latch hook may disengage from the docking receptacle and the second latch hook may disengage from the docking receptacle in response to an action at the release button.

A slider may move with respect to the first docking pole, and at least one ball may move based on movement of the slider.

The slider may include a first protrusion to move the at least one ball in a first direction from a first position to a second position when the slider moves with respect to the first docking pole, and the ball may move in a second direction from the second position to the first position when the docking receptacle disengages from the first docking pole.

The docking receptacle may include a magnetic device to cause the slider to move toward the magnetic device based on a magnetic force between the magnetic device and the slider.

The docking receptacle may further include an electric magnetic component to provide a magnetic force stronger than the magnetic force between the magnetic device and the slider.

A power supply may supply power, and when power is to be supplied to the electric magnetic component, the slider may be released from the magnetic device and move away from the magnetic device.

The display may display a release image, and the display portion may include logic to receive a touch input on the display with respect to the release image, and in response to receiving the touch input at the display, the power is to be provided to the electric magnetic component and the slider is to move away from the magnetic device.

Embodiments may include an electronic device that includes a base portion, a display portion and a docking connector. The base portion may have an input device. The display portion may have a display, a docking receptacle and a plurality of second electrical connectors. The docking connector may move relative to the base portion. The docking connector may include a docking pole, a slider to move with respect to the docking pole, and at least one ball to move based on movement of the slider.

The slider may include a protrusion to move the at least one ball in a first direction from a first position to a second position when the slider moves with respect to the docking pole.

The ball may move in a second direction from the second position to the first position when the docking receptacle disengages from the docking pole.

The docking receptacle may include a magnetic device to cause the slider to move toward the magnetic device based on a magnetic force between the magnetic device and the slider.

The docking receptacle may further include an electric magnetic component to provide a magnetic force stronger than the magnetic force between the magnetic block and the slider.

A power supply may supply power, and when power is to be supplied to the electric magnetic component, the slider may be released from the magnetic device and move away from the magnetic device.

The display may display a release image, and the display portion may include logic to receive a touch input on the display with respect to the release image, and in response to the touch input to the display, the power is to be provided to the electric magnetic component and the slider is to move away from the magnetic device.

An electronic device may include: a base portion having an input device, a display portion having a display, and the display portion having a docking receptacle with a plurality of second electrical connectors, a docking connector to move relative to the base portion, the docking connector having a plurality of first electrical connectors, and means for automatically disengaging the docking receptacle from the docking connector in response to a touch input on the display.

The docking connector may include a docking pole, a slider to move with respect to the docking pole, and at least one ball to move based on movement of the slider.

The docking receptacle may include a magnetic device to cause the slider to move toward the magnetic device based on a magnetic force between the magnetic device and the slider.

The docking receptacle may include an electric magnetic component to provide a magnetic force stronger than the magnetic force between the magnetic device and the slider.

An electronic device may include: a base portion having an input device, a display portion having a display, and the display portion having a docking receptacle with a plurality of second electrical connectors, a docking connector to move relative to the base portion, the docking connector having a plurality of first electrical connectors, and logic to automatically disengage the docking receptacle from the docking connector in response to a touch input at the display.

The docking receptacle may include a magnetic device to cause a slider of the docking connector to move toward the magnetic device based on a magnetic force between the magnetic device and the slider.

The docking receptacle may further include an electric magnetic component to provide a magnetic force stronger than the magnetic force between the magnetic device and the slider.

A non-transitory computer-readable medium may store instructions for controlling an electronic device having a base portion, a display portion and a docking connector to move relative to the base portion. The instructions may include instructions to display an image on a display of the display portion, and in response to a touch input relative to the displayed image, to automatically disengage the display portion from the base portion.

The display portion may disengage from the base portion by providing power to the docking receptacle.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
  a base portion having an input device;
  a display portion having a display and a docking receptacle with a plurality of second electrical connectors, the docking receptacle being in a box-shape that has inner surfaces and outer surfaces, the inner surfaces of the docking receptacle including inner side surfaces and inner end surfaces, and the plurality of second electrical connectors are provided on at least one of the inner side surfaces of the docking receptacle; and
  a docking connector to move relative to the base portion, and the docking connector including:
    a first docking pole to extend from the docking connector and to engage with the docking receptacle, the first docking pole including outer side surfaces and outer end surfaces, and
    a plurality of first electrical connectors on at least one of the outer side surfaces of the first docking pole, wherein the plurality of first electrical connectors on the one of the outer side surface of the first docking pole to respectively contact the plurality of second electrical connectors on the inner side surface of the docking receptacle.

2. The electronic device of claim 1, wherein the plurality of second electrical connectors includes a first set of connectors at a first inner side surface of the docking receptacle, and a second set of connectors at a second inner side surface of the docking receptacle.

3. The electronic device of claim 2, wherein the first set of connectors at the first inner side surface of the docking receptacle is to contact the plurality of first electrical connectors at an outer side surface of the first docking pole when the docking receptacle is provided at the first docking pole in a first configuration, and
  the second set of connectors at the second inner side surface of the docking receptacle is to contact the plurality of first electrical connectors at an outer side surface of the first docking pole when the docking receptacle is provided at the first docking pole in a second configuration.

4. An electronic device comprising:
  a base portion having an input device;
  a display portion having a display and a docking receptacle with a plurality of second electrical connectors on the docking receptacle; and
  a docking connector to move relative to the base portion, and the docking connector including:
    a first docking pole to extend from the docking connector and to engage with the docking receptacle, and
    a plurality of first electrical connectors on a top edge surface of the first docking pole, the plurality of first electrical connectors includes a first set of connectors and a second set of connectors,
  wherein the first set of connectors is a plurality of connectors arranged in a first row at the top edge surface of the first docking pole, and the second set of connectors is a plurality of connectors arranged in a second row at the top edge surface of the first docking pole, and the first row of the connectors is parallel to the second row of the connectors.

5. The electronic device of claim 4, wherein the plurality of second electrical connectors at the docking receptacle is to contact the first set of connectors at the top edge surface of the first docking pole when the docking receptacle is provided at the first docking pole in a first configuration, and
  the plurality of second electrical connectors at the docking receptacle is to contact the second set of connectors at the top edge surface of the first docking pole when the docking receptacle is provided at the first docking pole in a second configuration.

6. An electronic device comprising:
  a base portion having an input device;
  a display portion having a display and a docking receptacle with a plurality of second electrical connectors, wherein the docking receptacle includes a first hook receptacle and a second hook receptacle; and
  a docking connector to move relative to the base portion, and the docking connector including:
    a first docking pole to extend from the docking connector and to engage with the docking receptacle,
    a second docking pole to extend from the docking connector and to engage with the docking receptacle,
    a plurality of first electrical connectors being between the first docking pole and the second docking pole, and the first electrical connectors to engage with the second electrical
  connectors of the docking receptacle, wherein the first docking pole includes a first latch hook that extends from an outside edge of the first docking pole in a direction away from the plurality of first electrical connectors, and the second docking pole includes a second latch hook that extends from an outside edge of the second docking pole in a direction away from the plurality of first electrical connectors, wherein the first latch hook is to engage with an edge inside the first hook receptacle, and the second latch hook is to engage with an edge inside the second hook receptacle, and
    a release button at the docking connector to release the docking receptacle from both the first docking pole and the second docking pole by disengaging the first latch hook from the edge inside the first hook receptacle at the display portion and disengaging the second latch hook from the edge inside the second hook receptacle at the display portion, wherein the release button is to release the docking receptacle in response to an action at the release button.

7. An electronic device comprising:
  a base portion having an input device;

a display portion having a display and a docking receptacle with a plurality of second electrical connectors; and a docking connector to move relative to the base portion, and the docking connector including:
- a docking pole to extend from the docking connector and to engage with the docking receptacle,
- a plurality of first electrical connectors,
- a slider provided within the docking pole, and the slider to move with respect to the docking pole, the slider including at least one slot and at least one protrusion, and
- at least one ball to move based on movement of the slider, the at least one ball having a ball shape, and the at least one ball to move from the at least one slot based on movement of the slider.

8. The electronic device of claim 7, wherein the at least one protrusion is to move the at least one ball in a first direction from a first position to a second position when the slider moves with respect to the docking pole, and the ball is to move in a second direction from the second position to the first position when the docking receptacle disengages from the docking pole.

9. The electronic device of claim 7, wherein the docking receptacle includes a magnetic device to cause the slider to move toward the magnetic device based on a magnetic force between the magnetic device and the slider.

10. The electronic device of claim 9, wherein the docking receptacle further includes an electric magnetic component to provide a magnetic force stronger than the magnetic force between the magnetic device and the slider.

11. The electronic device of claim 10, further comprising a power supply to supply power, and when power is to be supplied to the electric magnetic component, the slider to be released from the magnetic device and move away from the magnetic device.

12. The electronic device of claim 11, wherein the display is to display a release image, and the display portion includes logic to receive a touch input on the display with respect to the release image, and
   in response to receiving the touch input at the display, the power is to be provided to the electric magnetic component and the slider is to move away from the magnetic device.

13. The electronic device of claim 7, wherein the at least one protrusion to move the at least one ball in a first direction from a first position to a second position when the slider moves with respect to the docking pole.

14. The electronic device of claim 13, wherein the ball is to move in a second direction from the second position to the first position when the docking receptacle disengages from the docking pole.

15. The electronic device of claim 7, wherein the docking receptacle includes a magnetic device to cause the slider to move toward the magnetic device based on a magnetic force between the magnetic device and the slider.

16. The electronic device of claim 15, wherein the docking receptacle further includes an electric magnetic component to provide a magnetic force stronger than the magnetic force between a magnetic block and the slider.

17. The electronic device of claim 16, further comprising a power supply to supply power, and when power is to be supplied to the electric magnetic component, the slider is to be released from the magnetic device and move away from the magnetic device.

18. The electronic device of claim 17, wherein the display is to display a release image, and the display portion includes logic to receive a touch input on the display with respect to the release image, and
   in response to the touch input at the display, the power is to be provided to the electric magnetic component and the slider is to move away from the magnetic device.

* * * * *